No. 665,783. Patented Jan. 8, 1901.
H. K. HESS.
PROCESS OF REGENERATING SPENT ELEMENTS OF PRIMARY BATTERIES.
(Application filed July 13, 1899.)
(No Model.)

Witnesses:-

Inventor:-
Henry K. Hess.
by his Attorneys
Howson & Howson

UNITED STATES PATENT OFFICE.

HENRY K. HESS, OF PHILADELPHIA, PENNSYLVANIA, ASSIGNOR TO HERMAN J. DERCUM, TRUSTEE, OF SAME PLACE.

PROCESS OF REGENERATING SPENT ELEMENTS OF PRIMARY BATTERIES.

SPECIFICATION forming part of Letters Patent No. 665,783, dated January 8, 1901.

Application filed July 13, 1899. Serial No. 723,705. (No specimens.)

*To all whom it may concern:*

Be it known that I, HENRY K. HESS, a citizen of the United States, residing in Philadelphia, Pennsylvania, have invented certain Improvements in Processes of Regenerating Spent Elements of Primary Batteries, of which the following is a specification.

The object of my invention is to regenerate the elements exhausted by the generation of electricity in a two-liquid primary battery. This process I carry out in the following manner, reference being had to the accompanying drawings.

Figure 1:
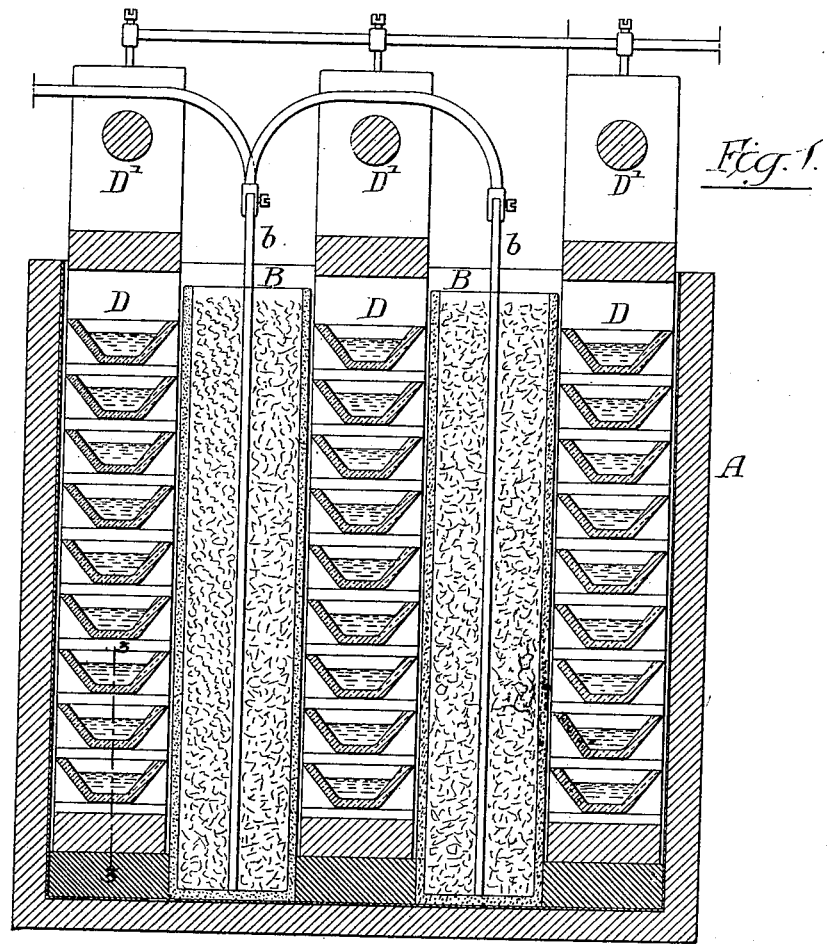
Figures 2, 3:
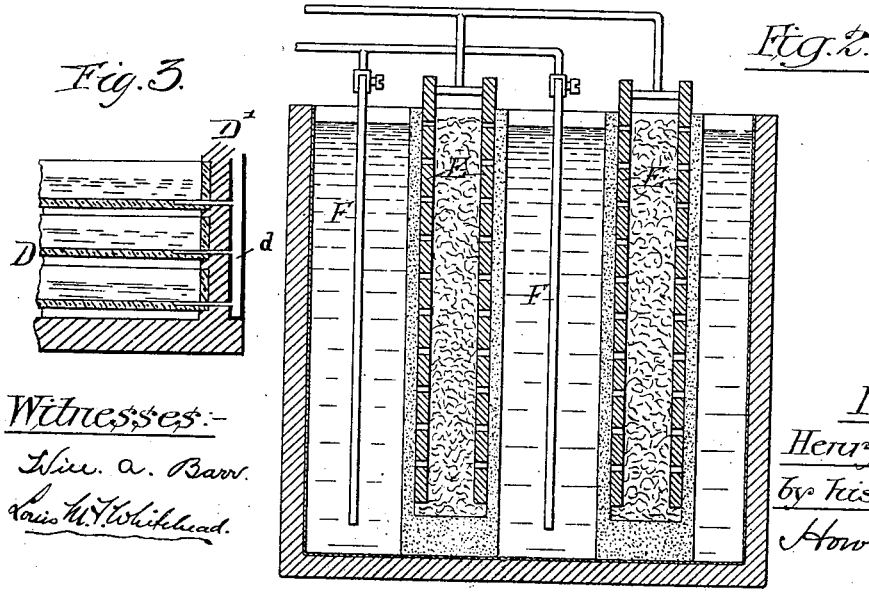

Figure 1 is a sectional view of one form of apparatus by which my process can be carried out, and Fig. 2 is a sectional view of another form of such apparatus. Fig. 3 is a sectional view on the line 3 3, Fig. 1.

My invention relates particularly to the regeneration of the elements used in a two-liquid primary battery in which dilute sulfuric acid is the electrolyte contained in one compartment and a depolarizing agent, such as chromic acid, is contained in another compartment. The partitions in such batteries are in the form of carbon plates, which act as one terminal, while zinc plates which are immersed in an electrolyte of dilute sulfuric acid form the other terminal. It is customary to throw away the spent liquors and the exhausted materials in this form of battery, as it is not practicable to restore a primary cell by electrolysis where carbons are used in view of the disintegrating effect of the electrolytic oxygen on the carbon, and it is not practicable to restore by electrolysis a primary battery having carbon and zinc electrodes when acid is used as the electrolyte, as the free acid generated reacts on the zinc and consumes the same.

By my invention I provide an independent regenerator in which the spent liquors of the two-liquid battery, with the decomposed zinc, are placed so that when the electric current from the dynamo or other suitable source of electric energy is passed through the regenerator the chromic acid and sulfuric acid will be regenerated and the zinc will be collected in suitable pans or on plates, as fully described hereinafter.

Fig. 1 of the drawings shows a container A, in which are porous cups B, filled with granular lead in the present instance and having a conducting-plate $b$, connected to one terminal of a dynamo, and in the spaces between the porous cups are trays D, in which mercury is placed, the mercury being connected to the other pole of the dynamo. As shown in Fig. 3, the trays D rest upon edges in a frame $D'$. $d$ is an insulated terminal wire having branches extending into the trays D, so as to be in contact with the mercury in the trays. The reduced chromium salt is placed in the porous cups B, and the zinc-sulfate solution is placed in the container A. I may use sheet-lead, preferably corrugated, graphite, platinum, or other material usually used as an anode in place of the granular lead mentioned above. When the liquids are subjected to the action of an electric current, the reduced chromium salt in the liquid will be reoxidized and the zinc will be precipitated or deposited in the trays containing mercury, and when the charge has been regenerated the racks $D'$, containing the trays, can be removed and emptied. The liquid can be carried off from the vessels in any suitable manner. The reactions illustrating these changes are as follows: For the liquid in the anode-compartment

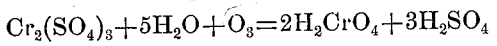
$$Cr_2(SO_4)_3 + 5H_2O + O_3 = 2H_2CrO_4 + 3H_2SO_4$$

and for the liquid in the cathode-compartment

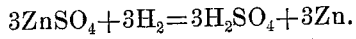
$$3ZnSO_4 + 3H_2 = 3H_2SO_4 + 3Zn.$$

By the terms "reduced chromium salt" or "chromium liquor" I refer to the solution found in the compartment formed by or containing the carbon electrode of the above-mentioned two-liquid battery after said battery has been exhausted. This solution is a sulfate of chromium, $Cr_2(SO_4)_3$, and is formed simultaneously with the zinc sulfate found in the compartment containing the zinc electrode.

By the process of regeneration herein described the zinc of the zinc sulfate is replaced by hydrogen, thereby forming or regenerating sulfuric acid and depositing the zinc in mercury. As an amalgam the zinc is completely protected from further action with the acid present. Similarly by the chemical action taking place in the above process the chromium sulfate has oxygen and water supplied to it—i. e., it is oxidized and chromic and sulfuric acid are formed.

In Fig. 2 I have shown another form of apparatus in which grids E are shown in the compartment for the chromium salt and amalgamated copper plates F are used in the compartment for the zinc sulfate in solution, so that when the action takes place the zinc will be deposited on the copper plates. Other forms of apparatus may be used without departing from the main feature of my invention.

The construction of the apparatus shown in Fig. 1 is not herein claimed, as it forms the subject of a separate application, Serial No. 726,663, filed August 9, 1899.

I claim as my invention—

1. The process herein described of regenerating the liquids of a two-liquid primary battery, said process consisting in simultaneously regenerating acid solutions of zinc sulfate and of chromium sulfate by separating the two liquids by means of a porous partition in such a way that the zinc sulfate remains in the cathode-compartment and the chromium sulfate in the anode-compartment, the anode being insoluble in and unattackable by the anode solution and subjecting the two solutions to the action of an electric current which enters the chromium sulfate and passes out of the zinc sulfate, whereby the zinc is precipitated from the zinc sulfate upon a cathode which will protect it from chemical action with the solutions present and the chromium sulfate is reoxidized to chromic acid and sulfuric acid, substantially as described.

2. The process herein described of simultaneously regenerating the acid solution of zinc sulfate and chromium sulfate, of a two-liquid primary battery, said process consisting in separating the chromium-sulfate solution from the zinc-sulfate solution by a porous partition, presenting to the latter a body of mercury and subjecting, simultaneously, the two liquids, viz. the zinc sulfate contained in the cathode-compartment and the chromium sulfate contained in the anode-compartment to the action of an electric current flowing from the anode to the cathode whereby the chromium sulfate will be reoxidized and the zinc from the zinc sulfate will be deposited in the body of mercury, substantially as described.

In testimony whereof I have signed my name to this specification in the presence of two subscribing witnesses.

HENRY K. HESS.

Witnesses:
WILL. A. BARR,
JOS. H. KLEIN.